UNITED STATES PATENT OFFICE.

ROBERT M. KEENEY AND LOUIS F. VOGT, OF WASHINGTON, PENNSYLVANIA, ASSIGNORS TO STANDARD CHEMICAL COMPANY, OF PITTSBURGH, PENNSYLVANIA.

FERRO-URANIUM ALLOY.

1,240,054.  Specification of Letters Patent.  Patented Sept. 11, 1917.

No Drawing.  Application filed December 24, 1915.  Serial No. 68,542.

*To all whom it may concern:*

Be it known that we, ROBERT M. KEENEY and LOUIS F. VOGT, citizens of the United States, and residents of Washington, in the county of Washington and State of Pennsylvania, have invented certain new and useful Improvements in Ferro-Uranium Alloys; and we do hereby declare the following to be a full, clear, and exact description of the invention, such as will enable others skilled in the art to which it appertains to make and use the same.

This invention relates to an improvement in alloys,—the object of the invention being to produce a ferro-uranium alloy in which a relatively large proportion of uranium may be effectually alloyed with the ferrous metal.

With this and other objects in view, the invention consists in a combination of alloyed metals as hereinafter set forth and pointed out in the claims.

The materials which we employ in the manufacture of ferro-uranium are uranium, preferably in the form of uranium oxid, fluorspar as a slag-forming material; a carbonaceous reducing agent, preferably petroleum coke containing at least seventy per cent. fixed carbon, and subdivided ferrous metals, such as iron or steel particles. Steel turnings may be employed with advantage. All of these materials should be as free as possible from impurities, especially silica or silicon. To attain the best results, the steel should not contain over 0.3 per cent. C; 0.15 per cent. Si; 0.1 per cent. S; 0.1 per cent. P.

We mix ferrous metal, such as steel particles or turnings with uranium oxid or sodium uranate. For example, in a 30 per cent. uranium product, we prefer to use the proportions approximately of 1 lb. of steel turnings to six-tenths of a pound of uranium oxid ($U_3O_8$). At the same time we mix in carbonaceous material (petroleum coke for example) containing at least 70 per cent. of fixed carbon. To this mixture of steel turnings, uranium oxid, and carbon, we add fluorspar in the proportions, approximately, of eight-tenths of a pound of fluorspar to one pound of steel turnings. The mixture thus formed is charged into an electric furnace at a rate dependent upon the size of the furnace and the grade of alloy being made, but in no case should the mixture be charged so fast as to cool the furnace to any great degree. Regular intervals of charging is a matter of considerable importance. In other words, a charge should be introduced into the furnace as soon as a previous charge has been reduced and melted. In the operation of the furnace, a portion of the charge will collect on the wall of the furnace and affords a protection to the lining,—the charge thus forming, in effect, a lining in the furnace.

The reactions involved are those of simple carbon reduction, the reduced uranium alloying with the steel turnings to form ferro-uranium, and may be represented as follows: $U_3O_8 + 8C = 3U + 8CO$.

We have found that fluorspar is the best and probably only slag-forming material which may be successfully used to obtain a reasonable proportion of uranium in the alloy, and it should be used in considerable quantity, and be of a high grade so as to avoid impurities which would be detrimental to the alloy.

A typical charge for the production of ferro-uranium (the uranium oxid containing 68.8 uranium or 82 per cent. $U_3O_8$; the coke 70 per cent. fixed carbon; the turnings 0.31 per cent. C and 0.098 per cent. Si) may be substantially as follows:—

| | |
|---|---|
| Steel turnings | 10 lbs. |
| Uranium oxid | 7.5 lbs. |
| Coke | 6 lbs. |
| Fluorspar | 8 lbs. |

Of the uranium put into this charge, at least 76 per cent. will be contained in the finished alloy. One hundred pounds of the said charge will produce approximately forty pounds of ferro-uranium, and by re-smelting the residue approximately 85 per cent. of the uranium would be alloyed with the steel and about 45 pounds of ferro-uranium obtained.

We do not claim in this case, the process herein described, the same being claimed in our copending application Serial No. 69,045.

The ferro-uranium made from the typical charge above stated will contain ingredients approximately in the following proportions:

| | | |
|---|---|---|
| U | 29.2 | per cent. |
| C | 5.12 | per cent. |
| Si | 2.68 | per cent. |
| Fe | 63. | per cent. |

Having fully described our invention what we claim as new and desire to secure by Letters-Patent, is:—

1. A ferro-uranium alloy containing more than twenty-five per cent. uranium.

2. A ferro-uranium alloy containing between twenty-five and thirty per cent. uranium and more than sixty per cent. ferrous metal.

3. An alloy consisting substantially of ferrous metal and uranium, the uranium content being approximately one-half as much as the ferrous metal.

In testimony whereof, we have signed this specification in the presence of two subscribing witnesses.

ROBERT M. KEENEY.
LOUIS F. VOGT.

Witnesses:
R. E. LAURENCE,
A. D. RILEY.